(12) United States Patent
Yamaoka (10) Patent No.: US 7,062,302 B2
(45) Date of Patent: Jun. 13, 2006

(54) MOBILE TERMINAL HAVING POWER SAVING FUNCTION VARIABLE WITH MICROPHONE USAGE CONDITIONS

(75) Inventor: Haruyasu Yamaoka, Kariya (JP)

(73) Assignee: DENSO Corporation, Kariya (JP)

( * ) Notice: Subject to any disclaimer, the term of this patent is extended or adjusted under 35 U.S.C. 154(b) by 605 days.

(21) Appl. No.: 09/854,242

(22) Filed: May 11, 2001

(65) Prior Publication Data

US 2001/0046887 A1 Nov. 29, 2001

(30) Foreign Application Priority Data

May 12, 2000 (JP) .............................. 2000-140150

(51) Int. Cl.
*H04Q 7/20* (2006.01)

(52) U.S. Cl. ...................... 455/574; 455/563; 455/568; 455/569; 455/79

(58) Field of Classification Search ................ 455/574, 455/79, 127.5, 116, 571, 573, 522, 69, 569.1, 455/575.2, 127.1, 569, 127, 568, 563
See application file for complete search history.

(56) References Cited

U.S. PATENT DOCUMENTS

| | | | | |
|---|---|---|---|---|
| 5,230,089 A * | 7/1993 | Kindinger et al. ............ | 455/79 |
| 5,761,622 A * | 6/1998 | Priest ......................... | 455/522 |
| 5,870,685 A * | 2/1999 | Flynn ......................... | 455/573 |
| 5,884,194 A * | 3/1999 | Shiraki ....................... | 455/570 |
| 5,978,689 A * | 11/1999 | Tuoriniemi et al. ....... | 455/569.1 |
| 6,026,288 A * | 2/2000 | Bronner .................... | 455/343.2 |
| 6,029,074 A * | 2/2000 | Irvin .......................... | 455/571 |
| 6,223,154 B1 | 4/2001 | Nicholls et al. | |
| 6,480,476 B1 * | 11/2002 | Willars ....................... | 370/311 |
| 6,480,700 B1 * | 11/2002 | Groe et al. ................... | 455/69 |
| 6,490,257 B1 * | 12/2002 | Watanabe et al. ........... | 370/318 |
| 6,535,752 B1 * | 3/2003 | Dent .......................... | 455/574 |
| 6,597,929 B1 * | 7/2003 | Han et al. ................... | 455/574 |
| 6,606,490 B1 * | 8/2003 | Rainish et al. ........... | 340/10.34 |

FOREIGN PATENT DOCUMENTS

JP 8-256201 10/1996

OTHER PUBLICATIONS

Notice of Rejection dated Jun. 1, 2004, in Japanese Application No. 2001-092871.

* cited by examiner

*Primary Examiner*—Temica Beamer
*Assistant Examiner*—Julio Perez
(74) *Attorney, Agent, or Firm*—Harness, Dickey & Pierce, PLC

(57) ABSTRACT

A mobile terminal has a plurality of thresholds corresponding to usage conditions including use of a handset, hands-free microphone, and earphone microphone. An operation controller checks the usage condition in response to a detection result of a usage detector. The operation controller retrieves a threshold corresponding to a check result from the storage unit, and outputs the retrieved threshold to a VOX controller unit. The mobile terminal thus achieves a VOX capability optimally in correspondence with various use conditions.

20 Claims, 8 Drawing Sheets

HANDSET THRESHOLD/CONDITION TABLE

| | |
|---|---|
| VOICE POWER THRESHOLD | $T_{HS\_P}$ |
| VOICE POWER DIFFERENTIAL THRESHOLD | $T_{HS\_PD}$ |
| BAND POWER THRESHOLD | $T_{HS\_PB}$ |
| REFLECTION COEFFICIENTS | $T_{HS\_r}$ |
| FREQUENCY BAND CONDITION | $f_{HS\_B}$ |

FIG. 2B

HANDS-FREE THRESHOLD/CONDITION TABLE

| | |
|---|---|
| VOICE POWER THRESHOLD | $T_{HF\_P}$ |
| VOICE POWER DIFFERENTIAL THRESHOLD | $T_{HF\_PD}$ |
| BAND POWER THRESHOLD | $T_{HF\_PB}$ |
| REFLECTION COEFFICIENTS | $T_{HF\_r}$ |
| FREQUENCY BAND CONDITION | $f_{HF\_B}$ |

FIG. 2C

HEADSET THRESHOLD/CONDITION TABLE

| | |
|---|---|
| VOICE POWER THRESHOLD | $T_{EM\_P}$ |
| VOICE POWER DIFFERENTIAL THRESHOLD | $T_{EM\_PD}$ |
| BAND POWER THRESHOLD | $T_{EM\_PB}$ |
| REFLECTION COEFFICIENTS | $T_{EM\_r}$ |
| FREQUENCY BAND CONDITION | $f_{EM\_B}$ |

FIG. 3

| USAGE | THRESHOLD/CONDITION | |
|---|---|---|
| HANDSET | VOICE POWER THRESHOLD | $T_{HS\_P}$ |
| HANDS-FREE | VOICE POWER THRESHOLD | $T_{HF\_P}$ |
| HEADSET | VOICE POWER THRESHOLD | $T_{EM\_P}$ |

FIG. 5

| USAGE | THRESHOLD/CONDITION | |
|---|---|---|
| HANDSET | VOICE POWER THRESHOLD<br>REFLECTION COEFFICIENTS | $T_{HS\_P}$<br>$T_{HS\_r}$ |
| HANDS-FREE | VOICE POWER THRESHOLD | $T_{HF\_P}$ |
| HEADSET | VOICE POWER THRESHOLD<br>REFLECTION COEFFICIENTS | $T_{EM\_P}$<br>$T_{EM\_r}$ |

FIG. 9

| USAGE | THRESHOLD/CONDITION | |
|---|---|---|
| HANDSET | VOICE POWER THRESHOLD<br>FREQUENCY BAND CONDITION | $T_{HS\_P}$<br>$f_{HS\_B}$ |
| HANDS-FREE | VOICE POWER THRESHOLD<br>FREQUENCY BAND CONDITION | $T_{HF\_P}$<br>$f_{HF\_B}$ |
| HEADSET | VOICE POWER THRESHOLD<br>FREQUENCY BAND CONDITION | $T_{EM\_P}$<br>$f_{EM\_B}$ |

HANDSET THRESHOLD/CONDITION TABLE A

| | |
|---|---|
| VOICE POWER THRESHOLD | $T_{HS\_P\_L}$ |
| VOICE POWER DIFFERENTIAL THRESHOLD | $T_{HS\_PD\_L}$ |
| BAND POWER THRESHOLD | $T_{HS\_PB\_L}$ |
| REFLECTION COEFFICIENTS | $T_{HS\_r\_S}$ |
| FREQUENCY BAND CONDITION | $f_{HS\_B}$ |

FIG. 6B

HANDS-FREE THRESHOLD/CONDITION TABLE A

| | |
|---|---|
| VOICE POWER THRESHOLD | $T_{HF\_P\_L}$ |
| VOICE POWER DIFFERENTIAL THRESHOLD | $T_{HF\_PD\_L}$ |
| BAND POWER THRESHOLD | $T_{HF\_PB\_L}$ |
| REFLECTION COEFFICIENTS | $T_{HF\_r\_S}$ |
| FREQUENCY BAND CONDITION | $f_{HF\_B}$ |

FIG. 6C

HEADSET THRESHOLD/CONDITION TABLE A

| | |
|---|---|
| VOICE POWER THRESHOLD | $T_{EM\_P\_L}$ |
| VOICE POWER DIFFERENTIAL THRESHOLD | $T_{EM\_PD\_L}$ |
| BAND POWER THRESHOLD | $T_{EM\_PB\_L}$ |
| REFLECTION COEFFICIENTS | $T_{EM\_r\_S}$ |
| FREQUENCY BAND CONDITION | $f_{EM\_B}$ |

FIG. 7A

HANDSET THRESHOLD/CONDITION TABLE B

| | |
|---|---|
| VOICE POWER THRESHOLD | $T_{HS\_P\_M}$ |
| VOICE POWER DIFFERENTIAL THRESHOLD | $T_{HS\_PD\_M}$ |
| BAND POWER THRESHOLD | $T_{HS\_PB\_M}$ |
| REFLECTION COEFFICIENTS | $T_{HS\_r\_M}$ |
| FREQUENCY BAND CONDITION | $f_{HS\_B}$ |

FIG. 7B

HANDS-FREE THRESHOLD/CONDITION TABLE B

| | |
|---|---|
| VOICE POWER THRESHOLD | $T_{HF\_P\_M}$ |
| VOICE POWER DIFFERENTIAL THRESHOLD | $T_{HF\_PD\_M}$ |
| BAND POWER THRESHOLD | $T_{HF\_PB\_M}$ |
| REFLECTION COEFFICIENTS | $T_{HF\_r\_M}$ |
| FREQUENCY BAND CONDITION | $f_{HF\_B}$ |

FIG. 7C

HEADSET THRESHOLD/CONDITION TABLE B

| | |
|---|---|
| VOICE POWER THRESHOLD | $T_{EM\_P\_M}$ |
| VOICE POWER DIFFERENTIAL THRESHOLD | $T_{EM\_PD\_M}$ |
| BAND POWER THRESHOLD | $T_{EM\_PB\_M}$ |
| REFLECTION COEFFICIENTS | $T_{EM\_r\_M}$ |
| FREQUENCY BAND CONDITION | $f_{EM\_B}$ |

FIG. 8A

HANDSET THRESHOLD/CONDITION TABLE C

| | |
|---|---|
| VOICE POWER THRESHOLD | $T_{HS\_P\_S}$ |
| VOICE POWER DIFFERENTIAL THRESHOLD | $T_{HS\_PD\_S}$ |
| BAND POWER THRESHOLD | $T_{HS\_PB\_S}$ |
| REFLECTION COEFFICIENTS | $T_{HS\_r\_L}$ |
| FREQUENCY BAND CONDITION | $f_{HS\_B}$ |

FIG. 8B

HANDS-FREE THRESHOLD/CONDITION TABLE C

| | |
|---|---|
| VOICE POWER THRESHOLD | $T_{HF\_P\_S}$ |
| VOICE POWER DIFFERENTIAL THRESHOLD | $T_{HF\_PD\_S}$ |
| BAND POWER THRESHOLD | $T_{HF\_PB\_S}$ |
| REFLECTION COEFFICIENTS | $T_{HF\_r\_L}$ |
| FREQUENCY BAND CONDITION | $f_{HF\_B}$ |

FIG. 8C

HEADSET THRESHOLD/CONDITION TABLE C

| | |
|---|---|
| VOICE POWER THRESHOLD | $T_{EM\_P\_S}$ |
| VOICE POWER DIFFERENTIAL THRESHOLD | $T_{EM\_PD\_S}$ |
| BAND POWER THRESHOLD | $T_{EM\_PB\_S}$ |
| REFLECTION COEFFICIENTS | $T_{EM\_r\_L}$ |
| FREQUENCY BAND CONDITION | $f_{EM\_B}$ |

MOBILE TERMINAL HAVING POWER SAVING FUNCTION VARIABLE WITH MICROPHONE USAGE CONDITIONS

CROSS REFERENCE TO RELATED APPLICATION

This application is based on and incorporates herein by reference Japanese patent application No. 2000-140150 filed May 12, 2000.

BACKGROUND OF THE INVENTION

The present invention relates to a mobile terminal, which reduces or interrupts power supplied to a transmitter unit based on the result of comparison of a physical quantity of transmitting voice with a threshold.

A variety of mobile terminals including cellular phones and car phones are used. These terminals in general are equipped with a voice-operated transmitter (VOX) capability. The VOX capability may reduce or interrupt the electric power supplied to a part of transmitter unit during silent period. This period can be determined based on the comparison of the acoustic power of user voice with a threshold (voice power threshold) when the power of user voice is less than the threshold, allowing the terminal to save power consumption during the silent period.

In these mobile terminals, the threshold for determining whether the user voice is present or absent is fixed to a preset value, irrespective of the status of use of the mobile system. When using this mobile terminal, a user may use the terminal with a hands-free microphone attached (hands-free usage), with a headset microphone attached (earphone usage), or with no optional accessory attached (handset usage). The characteristics of voice transmission via the microphone input in these respective hands-free, earphone microphone, and handset are all mutually different from each other in the actual condition of use. Thus, the VOX capability may work well in the handset usage with the fixed threshold, but may not in the hands-free usage.

The silent period may be determined by other methods. The other methods are, for example, a comparison of the power of voice transmission in a unit of time with a voice power differential threshold, a comparison of a specific power band of voice transmission with a power band threshold, a comparison of frequency components of voice transmission with a reflection coefficient, LSP coefficient or the like. However, as long as the thresholds are fixed, the above same problem remains.

SUMMARY OF THE INVENTION

The present invention has an object to provide a mobile terminal, which maximizes the VOX capability in any usage condition.

According to the present invention, a mobile terminal has a VOX controller which saves power to a part of a transmitter, and an operation controller which controls operation of the VOX controller. The mobile terminal also has a storage unit which stores a plurality of thresholds corresponding to a plurality of usage conditions, and a usage condition detector which determines in which one of the usage conditions the terminal is used. The operation controller selects one of the thresholds in correspondence with a detection result of the usage condition detector, and operates the VOX controller in accordance with the selected threshold.

The usage conditions may include a handset usage condition for processing voice input from a handset microphone, a hands-free microphone usage condition for processing voice input from a hands-free microphone and an earphone usage condition for processing voice input from a headset microphone. The threshold may be set with respect to at least one of a voice power, voice power differential, frequency bandwidth power and the like.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EMBODIMENTS

First Embodiment

Figure 1:
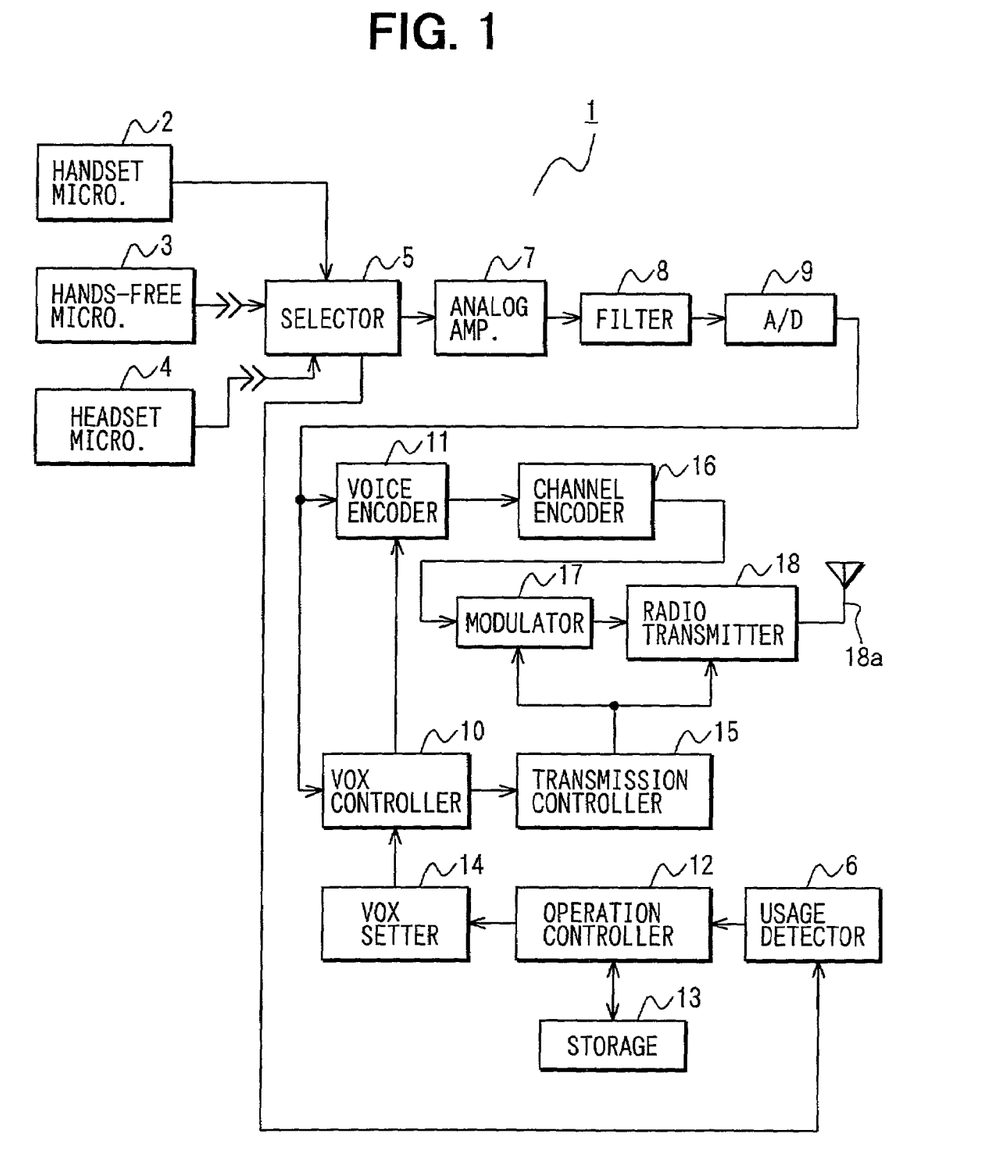
FIG. 1 is a schematic block diagram of a mobile terminal according to a first embodiment of the present invention.

Referring to FIG. 1, there is shown a schematic block diagram of a transmitter unit in a cellular phone terminal 1. The cellular phone terminal 1 has a capability of processing the voice input from a handset microphone 2 for the voice transmission. The cellular phone terminal 1 may also be used with a hands-free microphone 3 attached to the terminal body (not shown) to process the voice input from the hands-free microphone 3 for the voice transmission. The cellular phone terminal 1 may further be used with a headset microphone 4 attached to the terminal body to process the voice input from the headset microphone 4 for the voice transmission.

A selector 5 detects whether the hands-free microphone 3 or earphone microphone is connected to output the detection result to a usage detector 6 and to switch paths from the voice signal inputs accordingly.

More specifically, the selector 5 switches the path of voice transmission so as to output the input from the handset microphone 2 to an analog amplifier 7 as the voice transmission when neither the hands-free microphone 3 nor earphone microphone 4 is connected thereto. The selector 5 switches the path so as to output as the voice transmission signals the voice input from the hands-free microphone 3 to the analog amplifier 7 if the handset is placed on a cradle (not shown) or in a similar situation. The selector 5 switches the path from the input from the headset microphone 4 to output to the analog amplifier 7 if the headset microphone 4 is attached.

The analog amplifier 7 which receives the voice transmission signals through the selector 5 from either of the handset microphone 2, the hands-free microphone 3 or the headset microphone 4, amplifies the input voice signals to output the voice signals to a filter 8, which in turn eliminates unnecessary frequency components from the received voice transmission signals to output thus reshaped voice signals to an A/D converter 9.

The A/D converter 9 upon reception of the voice transmission signals from the filter 8 converts the voice transmission from analog domain to digital domain to output the digitized voice to both a voice-operated transmitter (VOX) controller 10 and to a voice encoder unit 11.

The usage detector 6, upon reception of detection result from the selector 5, detects the usage circumstances of the cellular phone terminal 1 based on the detection result input, and then outputs the detection result to an operation controller 12.

Figure 2A:
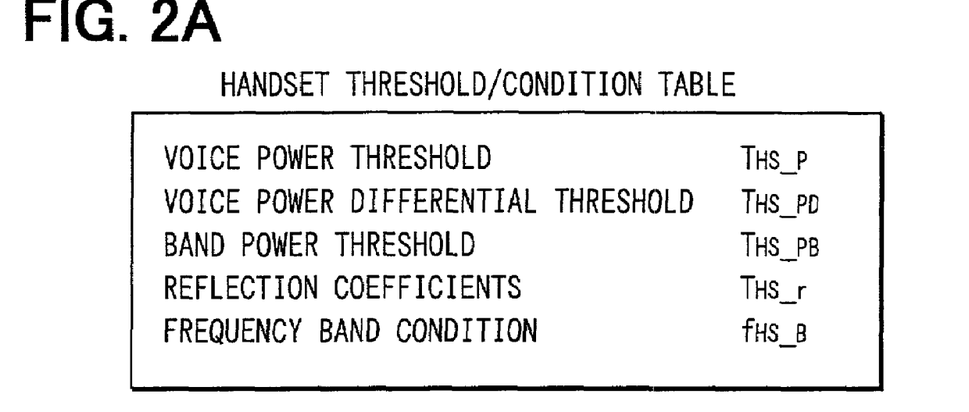
FIGS. 2A to 2C are tables showing threshold/band conditions used in the first embodiment.
Figure 2B:
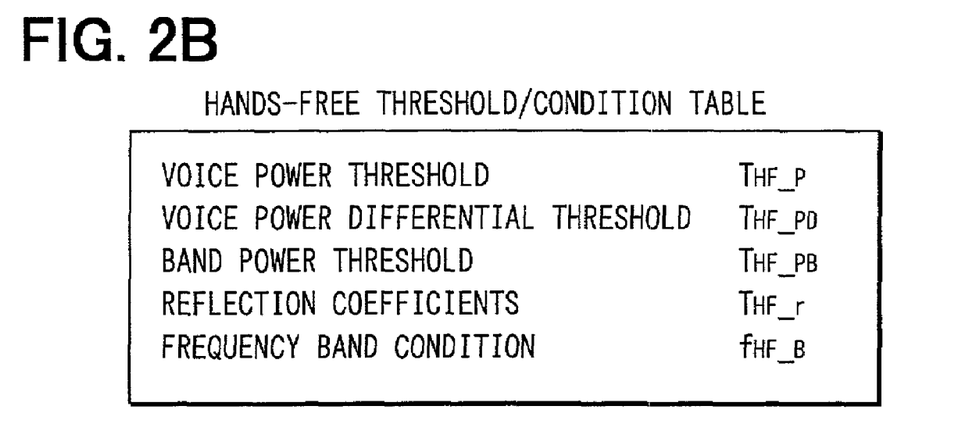
Figure 2C:
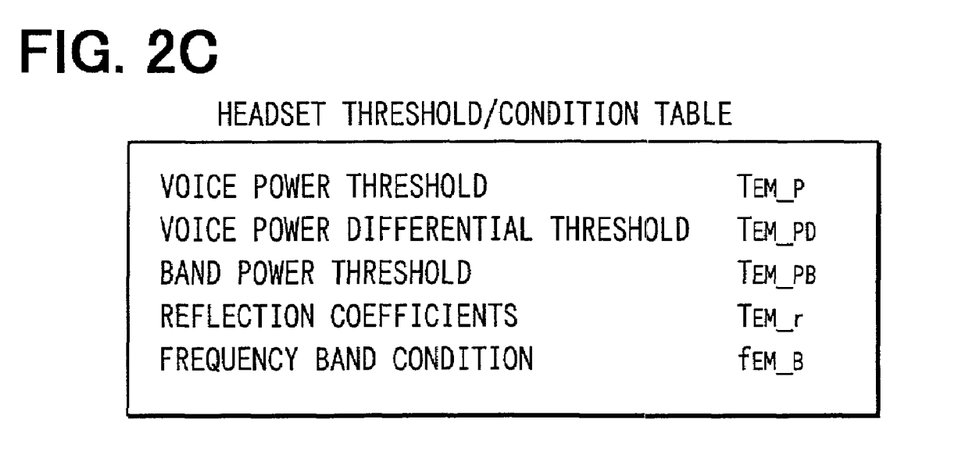

A storage unit 13 stores, as shown in FIGS. 2A to 2C, three tables of a threshold/frequency band condition table for handset microphone, a threshold/frequency band condition table for hands-free microphone, and a threshold/frequency band condition table for earphone microphone. The storage unit 13 stores four threshold values of a voice power threshold, a voice power differential threshold, a band power threshold and a reflection coefficient (and/or LSP coefficient or the like) for each of those tables for use with a handset, use with a hands-free microphone, and use with a headset microphone, at their optimum values for the VOX capability to work, as well as stores the frequency band conditions indicating the frequency bands.

The operation controller 12 having an input of the detection result from the usage detector 6 selects one of those three tables stored in the storage unit 13, according to the input detection result, and at least one threshold from four candidates of threshold stored in the selected threshold/frequency band table. Then, the operation controller 12 retrieves thus selected threshold and, if necessary, the frequency band conditions stored in the selected threshold/frequency band table.

The operation controller 12 outputs the threshold or the threshold conditions retrieved from the storage unit 13 to a VOX threshold/frequency band setter unit 14, which in turn accepts the threshold or threshold conditions from the operation controller 12 to output thus input threshold or threshold conditions to the VOX controller unit 10.

When inputting only the threshold from the VOX threshold/frequency band setter unit 14, the VOX controller unit 10, upon reception of voice transmission signals from the A/D converter 9, compares the physical quantity in relation to the input voice transmission signals with the threshold input from the VOX threshold/frequency band setter unit 14 to determine either a speak period or a silent period. Then the VOX controller unit 10 outputs the determination result to the voice encoder unit 11 and to a transmission controller unit 15.

In addition, when inputting both the threshold value and frequency band conditions from the VOX threshold/frequency band setter unit 14, the VOX controller unit 10, upon reception of voice transmission signals from the A/D converter 9, compares the physical quantity in relation to the frequency band indicated by the frequency band conditions in the input voice transmission signals with the threshold input from the VOX threshold/frequency band setter unit 14 to determine either a speak period or a silent period. The VOX controller unit 10 outputs the determination result to the voice encoder unit 11 and to the transmission controller unit 15.

The voice encoder unit 11 receives the voice transmission signals from the A/D converter 9 to encode the input signals using a predetermined voice encoding algorithm to output the encoded signals to a channel encoder unit 16 if the determination result input from the VOX controller unit 10 is indicating a speak period.

The channel encoder unit 16 receives the voice signals from the voice encoder unit 11 to perform a transmission path encoding of input voice signals, including error corrections and bit substitution to output to a modulator unit 17. The modulator unit 17 receives the input voice signals from the channel encoder unit 16 to modulate the input signals to output to a radio transmitter unit 18, which in turn receives the input voice signals from the modulator unit 17 to transit the signals via an antenna 18a as a radio wave transmission.

The transmission controller unit 15 supplies power of a predetermined level to the modulator unit 17 and radio transmitter unit 18 when the determination result input from the VOX controller unit 10 is indicating a speak period. On the other hand, if the determination result input from the VOX controller unit 10 is indicating a silent period, then the transmission controller unit 15 stops feeding power of a predetermined level to the modulator unit 17 and the radio transmitter unit 18, or reduces the power to supply to a level less than the predetermined one to attempt to achieve a saving of consumption power in the cellular phone terminal 1.

Figure 3:
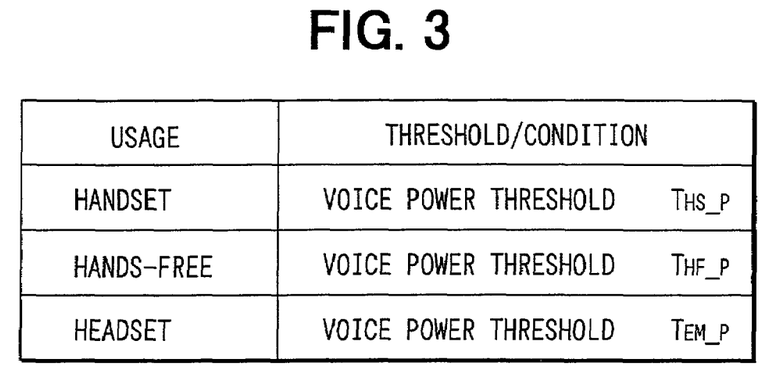
FIG. 3 is a table showing the relationship between the usage condition and the threshold/frequency band conditions in the first embodiment.
Figure 4:
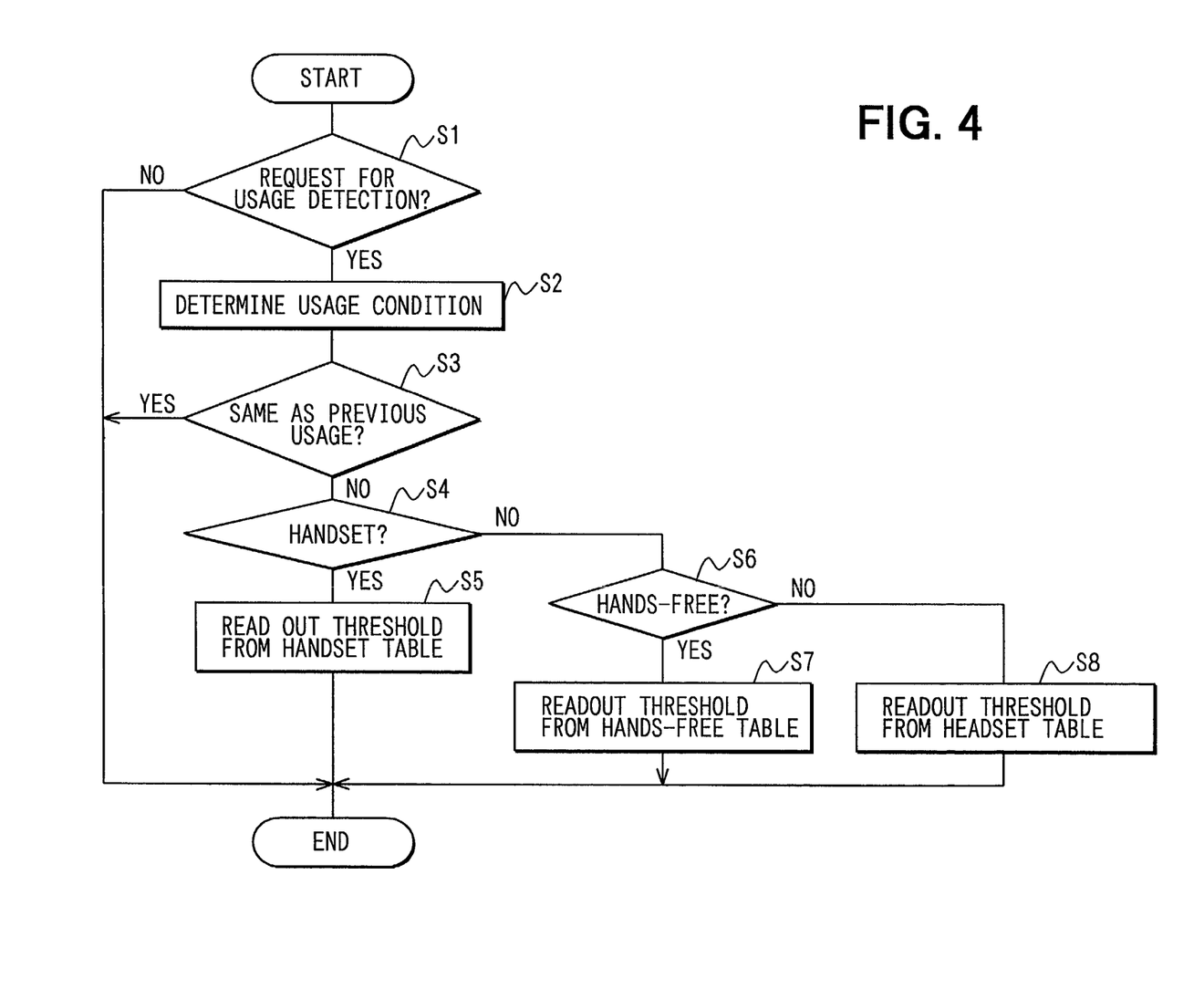
FIG. 4 is a flow chart showing the operation of the first embodiment.

Operation of the first embodiment will be described below with reference to FIG. 3 and FIG. 4. Here, it is assumed that the operation controller 12 will read out only the voice power threshold from the storage unit 13 in any usage condition, as shown in FIG. 3. More specifically, it is assumed that the operation controller 12 does not read out any values other than the voice power threshold, such as the voice power differential threshold, band power threshold, and reflection coefficient. Further, it is assumed that the operation controller 12 does not read out the frequency band conditions from the storage unit 13.

At first, the operation controller 12 checks whether there is a request (an event) of detecting the usage condition of the cellular phone terminal 1 (S1). When there is a request of detecting the usage condition of the cellular phone terminal 1, the operation controller 12 determines "YES" at step S1 and examines the detection result input from the usage detector 6 (S2). It determines the usage condition at that moment of time, and examines whether the usage condition at that moment of time is identical to the condition in the immediately previous usage (S3).

Here, if the usage condition at that moment of time is not the same as the past usage condition, then the operation controller 12 determines "NO" at step S3, thus selects one threshold/frequency band condition table from three tables of a threshold/frequency band condition table for handset, a threshold/frequency band condition table for hands-free microphone, and a threshold/frequency band condition table for earphone microphone, in accordance with the input detection result from the usage detector 6. Thereafter the operation controller 12 reads out a threshold, the voice power threshold in this example, from thus selected threshold/frequency band table.

That is, the operation controller 12 determines "YES" at step S4 if the detection result input from the usage detector 6 is indicating the handset in use, then select the threshold/frequency band condition table for use with handset, and read out the voice power threshold ($T_{HS\_P}$) from the selected threshold/frequency band condition table for use with the handset (S5).

The operation controller 12 outputs the voice power threshold ($T_{HS\_P}$) retrieved from the storage unit 13 to the VOX threshold/frequency band setter unit 14, while the VOX controller unit 10 compares the power of voice transmission input from the A/D converter 9 with the threshold that is the voice power threshold ($T_{HS\_P}$) for use with the handset. If the power of voice transmission input is more than or equal to the voice power threshold ($T_{HS\_P}$) then the VOX controller unit 10 infers a speak period. Otherwise, if the power of voice transmission input is less than the voice power threshold ($T_{HS\_P}$), then the VOX controller unit 10 infers a silent period.

If the detection result input from the usage detector 6 is indicating the usage condition of a hands-free call in use, then the operation controller 12 determines "NO" at step S4 and "YES" at step S6 to select the threshold/frequency band condition table for use with hands-free microphone, and then retrieves the voice power threshold ($T_{HF\_P}$) from thus selected threshold/frequency band condition table for use with hands-free microphone (S7).

Thereafter, the operation controller 12 outputs the voice power threshold ($T_{HF\_P}$) read out from the storage unit 13 to the VOX threshold/frequency band setter unit 14 while the VOX controller unit 10 compares the power of the voice transmission signals input from the A/D converter 9 with the voice power threshold ($T_{HF\_P}$) that is the threshold for use with a hands-free microphone.

If the power of voice transmission signal is more than or equal to the voice power threshold ($T_{HF\_P}$) then the VOX controller unit 10 infers a speak period. If otherwise the power of voice transmission signal is less than the voice power threshold ($T_{HF\_P}$) then the VOX controller unit 10 infers a silent period.

If the detection result input from the usage detector 6 is indicating the conditions of a headset microphone in use, then the operation controller 12 infers "NO" at step S4 and "NO" at step S6 to select the threshold/frequency band condition table for use with a headset microphone. It then reads out the voice power threshold ($T_{EM\_P}$) from the selected threshold/frequency band condition table for use with a headset microphone (S8).

The operation controller 12 outputs the voice power threshold ($T_{EM\_P}$) read out from the storage unit 13 to the VOX threshold/frequency band setter unit 14, while the VOX controller unit 10 compares the power of voice transmission input from the A/D converter 9 with the threshold that is the voice power threshold ($T_{EM\_P}$) for use with a headset microphone. If the power of voice transmission input is more than or equal to the voice power threshold ($T_{EM\_P}$), then the VOX controller unit 10 infers a speak period. Otherwise, if the power of voice transmission input is less than the voice power threshold ($T_{EM\_P}$), then the VOX controller unit 10 infers a silent period.

The above description is in the condition that only the voice power threshold is read out from the threshold/frequency band condition tables. It should be recognized that the threshold is not limited to the voice power threshold.

It should be understood that any one of the voice power threshold, voice power differential threshold, band power threshold and reflection coefficient may be read out. Also, an arbitrary combination of a plurality of thresholds among these thresholds can be retrieved.

In such cases that the voice power differential threshold is read out, the operation controller 12 compares the power of voice transmission in a unit time with the voice power differential threshold. If the power of voice transmission per unit time is greater than or equal to the voice power differential threshold, the operation controller 12 infers a speak period. If otherwise the power of voice transmission per unit time is less than the voice power differential threshold, the operation controller 12 infers a silent period.

Alternatively, when the band power threshold is read out, the operation controller 12 compares the power in a specific frequency band of voice transmission with the band power threshold. If the power in the specific frequency band of the voice transmission is more than or equal to the band power threshold, then the operation controller 12 infers a speak period. If otherwise the power in the specific frequency band of the voice transmission is less than the band power threshold, then the operation controller 12 infers a silent period.

In addition, when the reflection coefficient is read out, the operation controller 12 compares the frequency components (for example, a reflection coefficient) with the reflection coefficient. If the frequency components exceed the reflection coefficient, then the operation controller 12 infers a silent period.

As can be appreciated from the foregoing description, in accordance with the first embodiment, at least one of four thresholds consisted of the voice power threshold, the voice power differential threshold, the band power threshold and the reflection coefficient are read out in correspondence with the usage condition of the cellular phone terminal 1 and are used to compare at least one physical quantity in relation to the voice transmission of four physical quantities consisted of the power of voice transmission, the power of the voice transmission per unit time, the power of a specific frequency band of voice transmission, and the frequency components of voice transmission, with thus read out threshold.

The result of the comparison are used to stop feeding power to part of transmission system, the modulator unit 17 and the radio transmitter unit 18, or to reduce the power supplied thereto. This configuration allows to define an optimum value as the four thresholds as described above for each of those usage condition, that is, the threshold for use with a handset, threshold for use with a hands-free microphone, and threshold for use with a headset microphone, resulting in that the VOX capability may work well in any usage condition of the cellular phone terminal 1 to prevent the degradation of sound quality.

In this embodiment, the connection of the hands-free microphone 3 and the headset microphone 4 are automatically detected to determine to which usage condition the cellular phone terminal 1 is in. By connecting neither of the hands-free microphone 3 nor the headset microphone 4, in the usage condition with the handset microphone 2, the VOX capability may work well, being optimized for the usage of handset. In addition, by connecting the hands-free microphone 3 and by mounting the handset on a cradle (not shown) or the like, the VOX capability may work well in a manner optimized to the use with a hands-free microphone. Furthermore, by connecting the headset microphone 4, the VOX capability may work well in a manner optimized to the use with a headset microphone.

Second Embodiment

Figure 5:
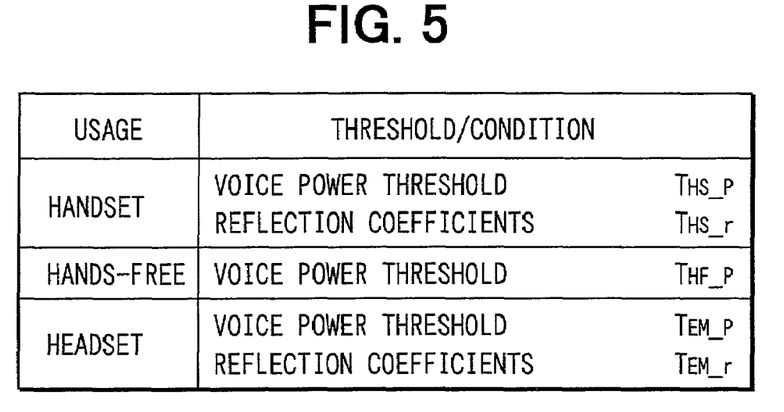
FIG. 5 is a table showing the relationship between the usage condition and the threshold/frequency band conditions in a second embodiment of the present invention.
Figure 6A:
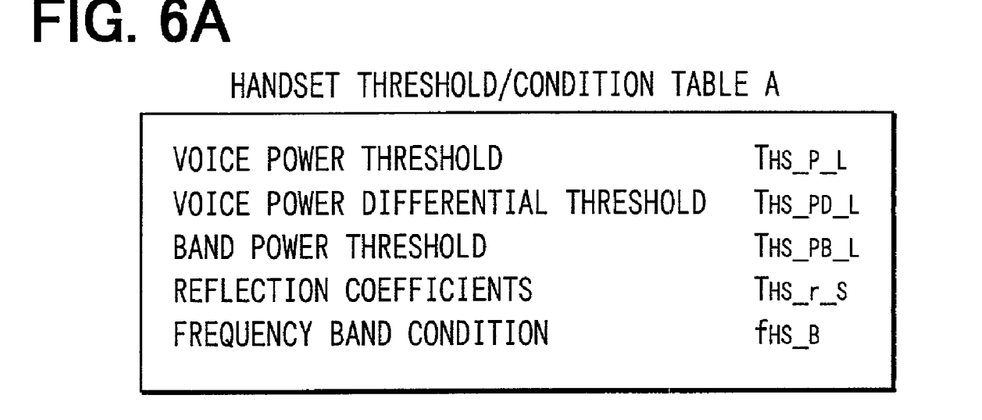
FIGS. 6A to 6C are tables showing threshold/band conditions used in a third embodiment of the present invention.
Figure 6B:
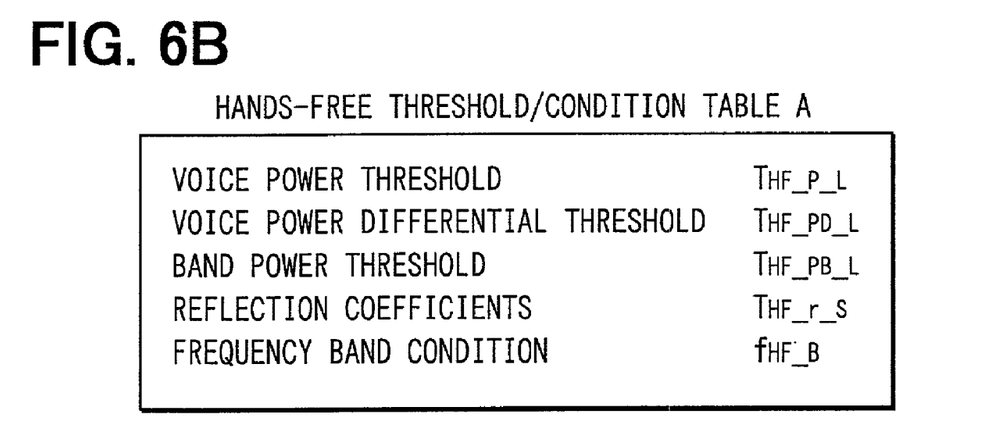
Figure 6C:
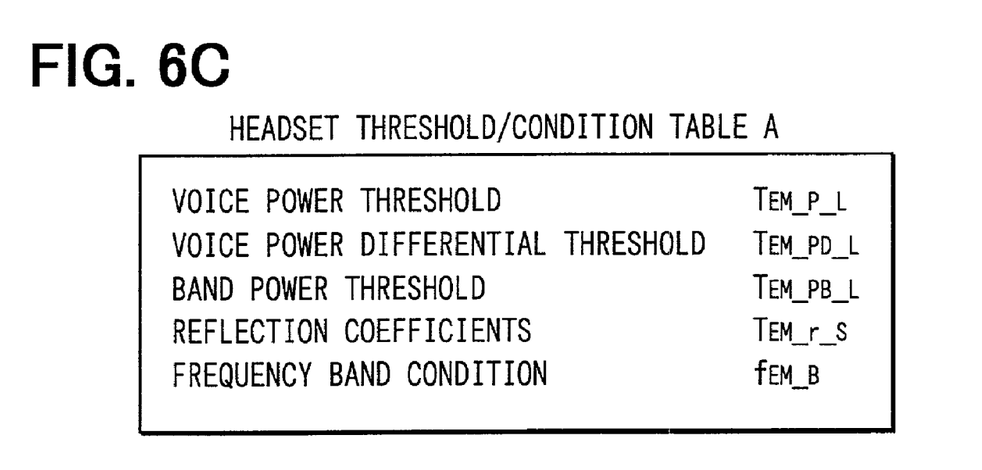
Figure 7A:
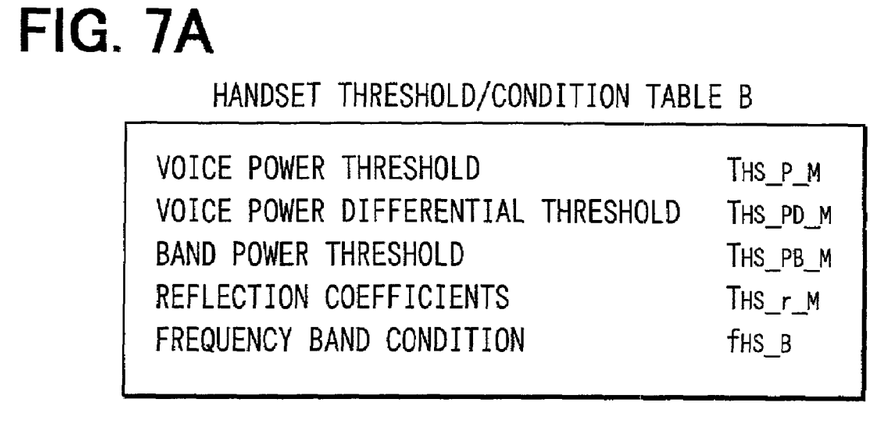
FIGS. 7A to 7C are tables showing further threshold/band conditions used in the fourth embodiment of the present invention.
Figure 7B:
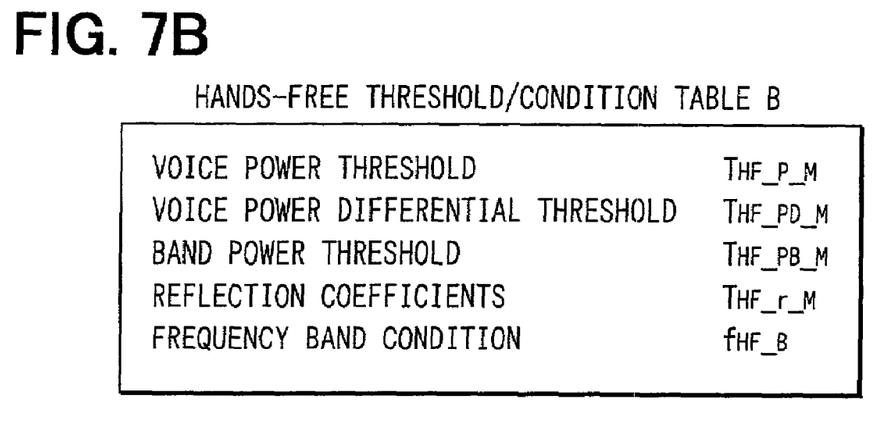
Figure 7C:
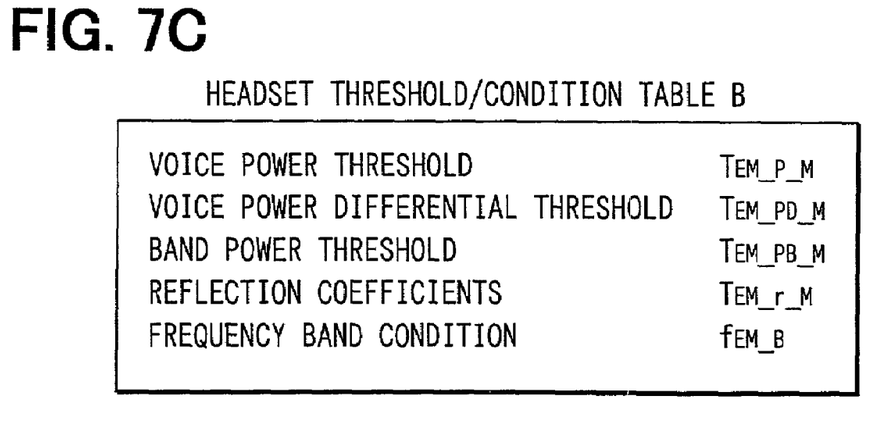
Figure 8A:
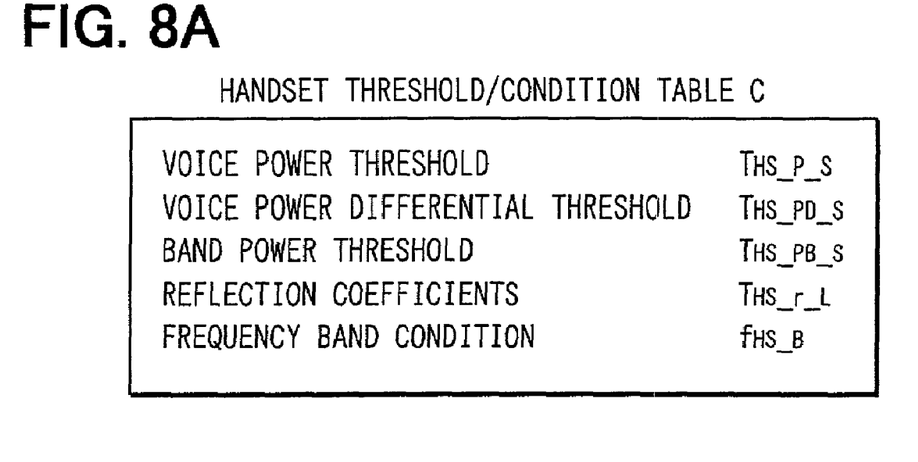
FIGS. 8A to 8C are tables showing still further threshold/band conditions used in the fourth embodiment of the present invention.
Figure 8B:
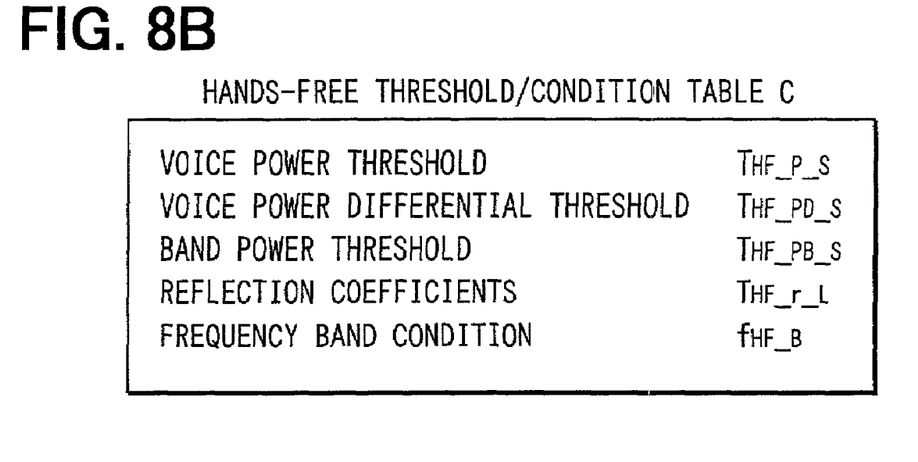
Figure 8C:
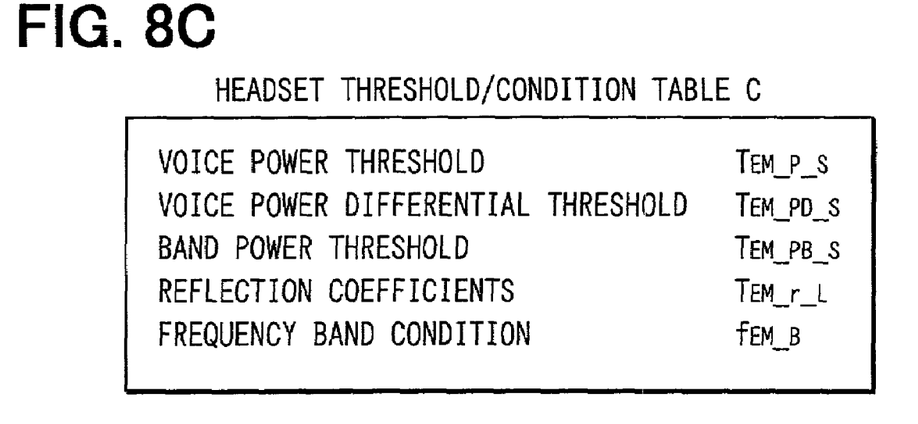

A second embodiment has the similar hardware configuration as the first embodiment, but it retrieves a threshold having a mutually different unit system as shown in FIG. 5.

More specifically, the operation controller 12 reads out two thresholds, that is, the voice power threshold ($T_{HS\_P}$) and frequency band threshold ($T_{HS\_r}$), from the threshold/band condition table for use with a handset if the handset microphone 2 is in use. The VOX controller unit 10 compares the power of voice transmission with the voice power threshold ($T_{HS\_P}$) as well as with the frequency band threshold ($T_{HS\_r}$), or compare two physical quantities in relation to the voice transmission with their thresholds to infer the speak or silent period.

The operation controller 12 in the hands-free use reads out for example only one, voice power threshold ($T_{HF\_P}$) from the threshold/frequency band condition table for use with a hands-free microphone. The VOX controller unit 10 compares the power of voice transmission with the voice power threshold ($T_{HF\_P}$), that is, one physical quantity in association with the voice transmission with the respective threshold chosen to infer the speak or silent period.

The operation controller 12 in use with the headset microphone 4 reads out two thresholds, voice power threshold ($T_{EM\_P}$) and reflection coefficient ($T_{EM\_r}$) from the threshold/frequency band condition table for use with a headset microphone. The VOX controller unit 10 compares the power of voice transmission with the voice power threshold ($T_{EM\_P}$) and the frequency components of voice transmission with the reflection coefficient ($T_{EM\_r}$), that is, two physical quantities in association with the voice transmission with their respective threshold to infer the silent or speak period.

As can be appreciated from the foregoing description of the second embodiment, the same advantage as the previous first embodiment can be achieved. In particular, in the second embodiment, the VOX capability can be invoked based on those two thresholds of the voice power threshold and the frequency components threshold if the cellular phone terminal 1 has been transit to the usage condition with a handset or the condition with a headset microphone, or the VOX capability can be invoked based on only one threshold of the voice power threshold if the cellular phone terminal 1 has been transit to the hands-free usage condition. In general, based on the fact that the voice signals will be unlikely to be interfered by the affecting ambient noise when using a handset microphone or a headset microphone while on the other hand the voice signals will be likely to be affected by the ambient noise when using a hands-free microphone, the VOX capability will work much better with a handset microphone or a headset microphone by comparing the frequency components of voice transmission with the frequency components threshold in addition to comparing the power of voice transmission with the voice power threshold.

Third Embodiment

A third embodiment also has the similar configuration as the first embodiment. This embodiment uses a plurality of threshold/frequency band condition tables stored for each of usage condition.

For example, as shown in FIGS. 6A to 6C through FIGS. 8A to 8C, the storage unit 13 may store three tables of threshold/frequency band condition tables A to threshold/frequency band condition table C for each of the conditions of usage with the handset, the hands-free microphone 3, and the headset microphone 4. Thus the storage unit 13 stores nine threshold/frequency band condition tables in total.

The storage unit 13 stores the threshold/frequency band condition table A (FIGS. 6A to 6C) for each of conditions of usage with the handset, the hands-free microphone, and the headset microphone such that the voice power threshold, voice power differential threshold, and the band power threshold may be larger values than the optimum ones for the VOX capability and such that the frequency components threshold may be smaller value than the optimum one for the VOX capability. That is, each threshold is predefined such that the VOX capability may be easily triggered, when compared with the threshold/frequency band condition table B as will be described later.

The storage unit 13 also stores the threshold/frequency band condition table B (FIGS. 7A to 7C) for each of condition of usage with the handset, the hands-free microphone, and the headset microphone such that the voice power threshold, voice power differential threshold, band power threshold and frequency components threshold may be optimum values for the VOX capability.

In addition, the storage unit 13 stores the threshold/frequency band condition table C (FIGS. 8A to 8C) for each of condition of usage with the handset, the hands-free microphone, and the headset microphone such that the voice power threshold, voice power differential threshold, and the band power threshold may be smaller values than the optimum ones for the VOX capability and such that the frequency components threshold may be larger value than the optimum one for the VOX capability. That is, each threshold is predefined such that the VOX capability may be hard to work when compared with the threshold/frequency band condition table B as have been described earlier.

As can be appreciated from the foregoing description, the third embodiment may achieve the advantage similar to that provided by the previous first embodiment. The third embodiment in particular is configured such that a threshold may be read out from the threshold/frequency band condition table A among the threshold/frequency band condition tables A to C so as to allow the VOX capability to operate in a manner sensitive, as well as such that a threshold may be read out from the threshold/frequency band condition table C among the threshold/frequency band condition tables A to C so as to allow the VOX capability to operate in a manner insensitive in order to vary the level of sensitivity to trigger the VOX capability.

Fourth Embodiment

A fourth embodiment has the similar hardware configuration as the first embodiment. This embodiment reads out the frequency band conditions in addition to the threshold so as to permit the physical quantity of voice transmission in mutually different frequency band each other to be compared with a corresponding threshold in each of usage condition.

Figure 9:
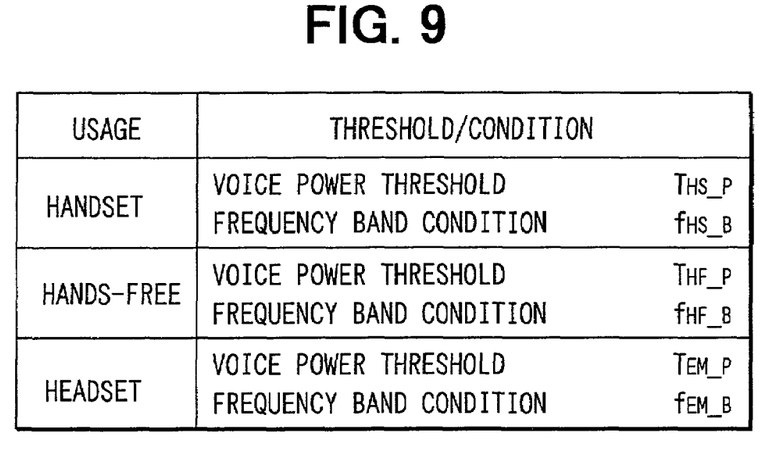
FIG. 9 is a table showing the relationship between the usage condition and the threshold/frequency band conditions in a fourth embodiment of the present invention.

More specifically, as shown in FIG. 9, the storage unit 13 stores a frequency band in the range from 0.3 kHz to 3.4 kHz for the bandwidth condition for use with the handset ($F_{HS\_B}$) and for the bandwidth condition for use with the headset microphone ($F_{EM\_B}$). In addition, the storage unit 13 also stores another frequency bandwidth having some lower frequency bandwidth eliminated from the bandwidth from 0.3 kHz to 3.4 kHz, for instance in the range from 0.5 kHz to 3.4 kHz for the bandwidth condition for use with the hands-free microphone ($F_{HF\_B}$).

The operation controller 12 retrieves the voice power threshold ($T_{HS\_P}$) from the threshold/frequency band condition table for use with the handset and a bandwidth condition ($F_{HS\_B}$) when operating with a handset in use. The VOX controller unit 10 then compares the power of voice transmission in the frequency band indicated by the bandwidth condition with the voice power threshold ($T_{HS\_P}$) to infer a speak period or a silent period.

In addition, the operation controller 12 retrieves the voice power threshold ($T_{HF\_P}$) from the threshold/frequency band condition table for use with the hands-free microphone and a bandwidth condition ($F_{HF\_B}$) for use with a hands-free microphone. The VOX controller unit 10 then compares the power of voice transmission in the frequency band indicated by the bandwidth condition with the voice power threshold ($T_{HF\_P}$) to infer a speak period or a silent period.

In addition, the operation controller 12 retrieves the voice power threshold ($T_{EM\_P}$) from the table for use with the headset microphone and the bandwidth condition ($F_{EM\_B}$) for use with a headset microphone. The VOX controller unit 10 then compares the power of voice transmission in the frequency band indicated by the bandwidth condition with the voice power threshold ($T_{EM\_P}$) to infer a speak period or a silent period.

As can be appreciated from the foregoing description, the fourth embodiment of the present invention may achieve the same advantage as the foregoing first embodiment. In the present fourth embodiment in particular, the VOX capability operated based on the bandwidth condition in the range from 0.3 kHz to 3.4 kHz if the cellular phone terminal 1 has been changed to the usage condition with the handset or the headset microphone. On the other hand, if the cellular phone terminal 1 has been changed to the usage condition with a hands-free microphone, then the VOX capability operates based on the bandwidth condition in the range from, for instance, 0.5 kHz to 3.4 kHz, resulted from the frequency band of 0.3 kHz to 3.4 kHz with the lower frequency band eliminated. The hands-free microphone is often used in a vehicle and based on the fact that the voice signals are likely to be affected by the ambient low frequency band noises during driving, the VOX capability operates in a more suitable manner by cutting the low frequency components.

Fifth Embodiment

A fifth embodiment also has the similar hardware configuration as the first embodiment. This embodiment selects a threshold/frequency band condition table in correspondence with the detection result of a manual key operation.

Figure 10:
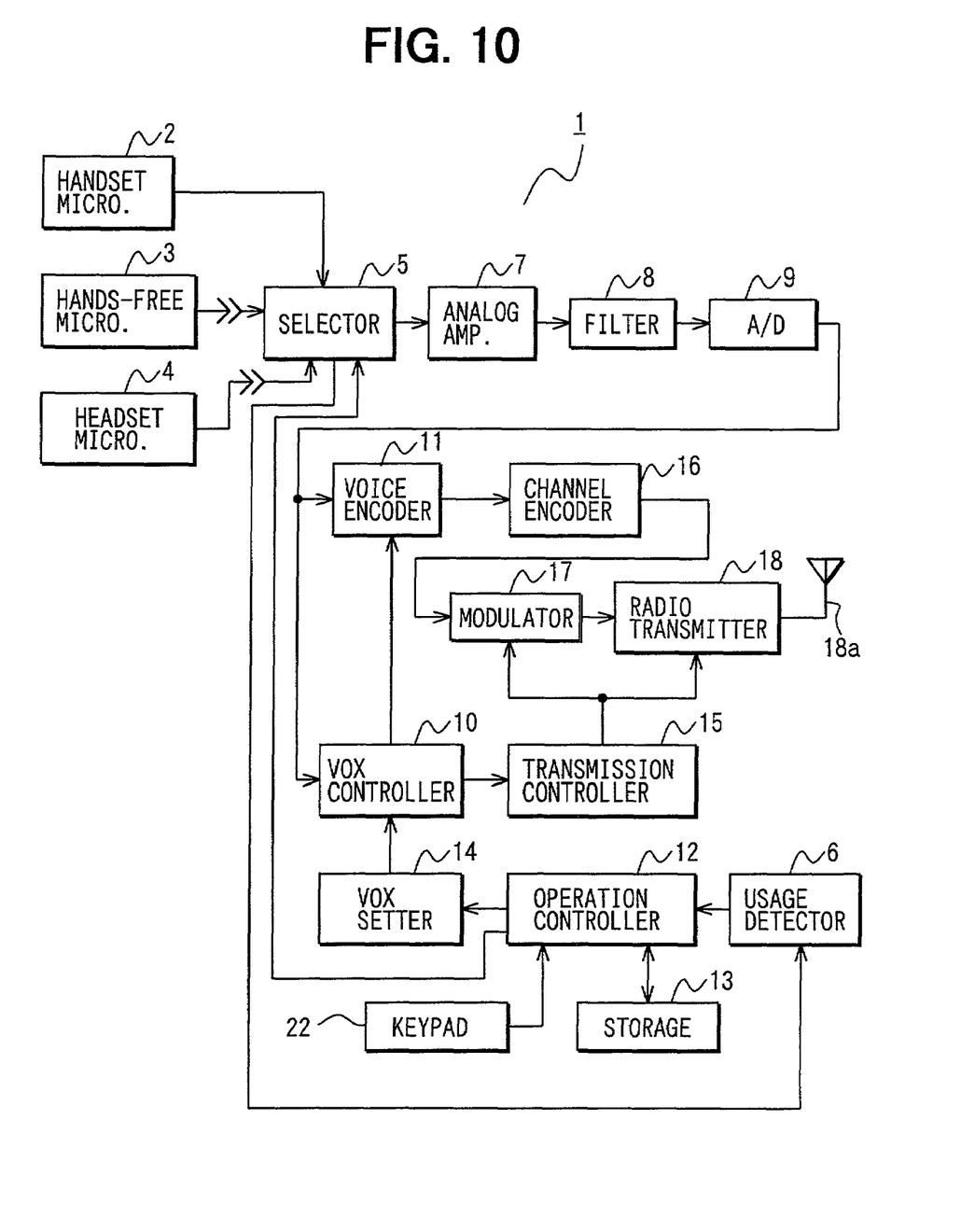
FIG. 10 is a schematic block diagram of a mobile terminal according to a fifth embodiment of the present invention.

More specifically, in the cellular phone terminal 1, a manually-operable keypad 22 includes a number of keys such as an ON key for hanging off, an OFF key for hanging up, numeric keys 0 to 9 for input of phone numbers, function keys for setting and releasing a variety of functions, and the like. When a user operates the keypad 22, key entry notification indicating key operation is output to the controller unit 12.

The controller unit 12 upon reception of the key entry notification from the keypad 22 scans the key entry in response to the key entry notification input. Then the controller unit 12 selects a threshold/frequency band condition table corresponding to the detection result. It selects at least one threshold from four thresholds stored in the threshold/frequency band condition table selected, and retrieves thus selected threshold. If necessary, it retrieves the bandwidth condition stored in the selected threshold/frequency band condition table.

The controller unit 12 responds to the detection result by outputting the switching instruction to the selector 5. In turn, the selector 5 switches the path of voice transmission in accordance with the input instruction upon input of a switching instruction from the controller unit 12.

As can be appreciated from the foregoing description, the fifth embodiment may achieve the same advantage as the first embodiment. This fifth embodiment in particular may read out a threshold or a bandwidth condition in response to the key entry in the keypad 22, and will operate the VOX capability in correspondence with thus retrieved threshold or the bandwidth condition. Accordingly, by a manual key entry in the keypad 22, the VOX capability will optimally work regardless of the usage condition in which the cellular phone terminal 1 is used.

Other Embodiments

The present invention may be embodied in other specific forms without departing from the spirit or essential characteristics thereof. Various changes and modifications may be made to the disclosed embodiments. For instance, a mobile phone terminal may not be limited to a cellular phone, and may also include a car phone (land mobile radio telephone system). The terminal may be alternatively a phone terminal of the personal digital cellular (PDC) system, a phone terminal of the code division multiple access (CDMA) system, or a phone terminal in another type of communication system.

The number of threshold/frequency band condition tables in total in the third embodiment may not be limited to "9" but may be any other number than nine, and any one threshold/frequency band condition table may be selected in correspondence with a manual key entry.

It will be appreciated by those skilled in the art that the frequency band of the bandwidth condition in each of usage condition in the fourth embodiment may not be limited to a range from 0.3 kHz to 3.4 kHz or from 0.5 kHz to 3.4 kHz, but may be in any other desired frequency range.

Furthermore, a plurality of thresholds may be used for one single physical quantity. For instance, two thresholds may be provided as the voice power threshold in order to infer a speak period in the condition that the power of voice transmission is less than one voice power threshold continuously for a predetermined period of time and thereafter the power of voice transmission becomes more than the other voice power threshold. Still further, the thresholds may be determined mathematically without using the stored table data.

What is claimed is:

1. A mobile terminal comprising:
VOX controller means for reducing a power feed to a part of a transmitter;
operation controller means for controlling operation of the VOX controller means in accordance with voice input from a user;
storage means for storing a plurality of thresholds for each of a plurality of usage conditions; and
usage condition detector means for determining in which one of the plurality of usage conditions the terminal is shifted in,
wherein the operation controller means is constructed to select one of the thresholds in correspondence with a detection result by the usage condition detector means and to operate the VOX controller means by comparing the voice input with the selected threshold.

2. The mobile terminal according to claim 1, wherein:
the usage condition detector means is constructed to detect a handset usage condition for processing the voice input from a handset microphone for a voice transmission, a hands-free microphone usage condition for processing the voice input from a hands-free microphone for the voice transmission, and an earphone usage condition for processing the voice input from a headset microphone for the voice transmission.

3. The mobile terminal according to claim 2, wherein:
the usage condition detector means is constructed to automatically check whether the hands-free microphone and the headset microphone are in use thereby to determine in which usage condition of the handset usage, the hands-free microphone usage, and the headset microphone usage the mobile terminal is shifted.

4. The mobile terminal according to claim 3, wherein:
the usage condition detector means is constructed to check whether the hands-free microphone is connected and the handset is placed on a cradle thereby to determine the terminal is shifted in the hands-free microphone usage condition.

5. The mobile terminal according to claim 1, wherein:
the VOX controller means is constructed to compare at least one physical quantity of a plurality of physical quantities each having a different unit system as the physical quantity in relation to the voice transmission with a threshold;
the operation controller means is constructed to select at least one threshold having one unit to operate the VOX controller means in accordance with the selected at least one threshold, when the usage condition detector means determines one of the usage conditions; and
the operation controller means selects at least one of thresholds having another unit different from the one unit to operate the VOX controller means in accordance with at least the selected other threshold, when the usage condition detector means determines another usage condition different from the one of usage conditions.

6. The mobile terminal according to claim 5, wherein:
the VOX controller means is constructed to compare with a threshold at least one of a power of voice transmission and a frequency component of voice transmission used as the physical quantity in relation to the voice transmission;
the operation controller means is constructed to select a threshold in relation to the power of voice transmission and a threshold in relation to the frequency component of voice transmission and use the threshold selected for the power of voice transmission and the threshold selected for the frequency component of voice transmission to operate the VOX controller means, when the usage condition detector means determines either one of the handset usage condition or the headset microphone usage condition; and
the operation controller means is constructed to select a threshold in relation to the power of voice transmission and uses the threshold selected for the power of voice transmission to operate the VOX controller means, when the usage condition detector means determines the hands-free microphone usage condition.

7. The mobile terminal according to claim 1, wherein:
the storage means further stores a plurality of thresholds each different from one other, which has the same unit for the same usage condition.

8. A mobile terminal comprising:
VOX controller means for reducing a power feed to a part of a transmitter;
operation controller means for controlling operation of the VOX controller means in accordance with voice input from a user;
storage means for storing a plurality of thresholds corresponding to a plurality of usage conditions; and
usage condition detector means for determining in which one of the plurality of usage conditions the terminal is shifted in, wherein
the operation controller means is constructed to select one of the thresholds in correspondence with a detection result by the usage condition detector means and to operate the VOX controller means by comparing the voice input with the selected threshold;
the storage means further stores a plurality of bandwidth conditions corresponding to the plurality of usage conditions;
the operation controller means is constructed to select one bandwidth condition having one predetermined frequency bandwidth and use the one bandwidth condition thus selected to operate the VOX controller means, when the usage condition detector means determines one usage condition; and
the operation controller means is constructed to select one of other bandwidth conditions each having a predetermined frequency bandwidth different from the one predetermined frequency bandwidth and use the bandwidth condition thus selected to operate the VOX controller means, when the usage condition detector means determines one of other usage conditions different from the one usage condition.

9. The mobile terminal according to claim 8, wherein:
the operation controller means is constructed to select one bandwidth condition having one predetermined frequency bandwidth and use the one bandwidth condition thus selected to operate the VOX controller means, when the usage condition detector means determines the handset usage condition or the headset microphone usage condition; and
the operation controller means is constructed to select one of other bandwidth conditions each having a predetermined frequency bandwidth different from the one predetermined frequency bandwidth and use the one of the other bandwidth conditions thus selected to operate the VOX controller means, when the usage condition detector means determines the hands-free microphone usage condition.

10. The mobile terminal according to claim 1, wherein:
the operation controller means is constructed to select a threshold corresponding to a predetermined manual entry of operating keypad means from a plurality of thresholds stored in the storage means and use thus selected threshold to operate the VOX controller means.

11. A method of controlling a mobile terminal having a handset microphone and connectable to an external microphone, the method comprising the steps of:
detecting which one of the microphones is in use;
setting a threshold variably depending on a result of the detecting step, the threshold being for use in controlling a power used in the mobile terminal for input voice transmitting operation;
detecting a parameter related to an input voice;
comparing the detected parameter with the threshold to detect an insubstantial voice input period; and reducing the power used for the input voice transmitting operation during the insubstantial voice input period.

12. The method as in claim 11, wherein:
the parameter includes at least one of the input voice power, a voice power differential, a band power and a frequency component.

13. A mobile terminal comprising:
VOX controller means for reducing a power feed to a part of a transmitter;
operation controller means for controlling operation of the VOX controller means;
storage means for storing a plurality of thresholds for each of a plurality of usage conditions; and
usage condition detector means for determining in which one of the plurality of usage conditions the terminal is shifted in; wherein
the operation controller means is constructed to select one of the thresholds in correspondence with a detection result by the usage condition detector means and to operate the VOX controller means in accordance with the selected threshold; and
the usage condition detector means is constructed to detect a handset usage condition for processing voice input from a handset microphone for a voice transmission, a hands-free microphone usage condition for processing voice input from a hands-free microphone for the voice transmission, and an earphone usage condition for processing voice input from a headset microphone for the voice transmission.

14. The mobile terminal according to claim 13, wherein:
the usage condition detector means is constructed to automatically check whether the hands-free microphone and the headset microphone are in use thereby to determine in which usage condition of the handset usage, the hands-free microphone usage, and the headset microphone usage the mobile terminal is shifted.

15. The mobile terminal according to claim 14, wherein:
the usage condition detector means is constructed to check whether the hands-free microphone is connected and the handset is placed on a cradle thereby to determine the terminal is shifted in the hands-free microphone usage condition.

16. A mobile terminal comprising:
VOX controller means for reducing a power feed to a part of a transmitter;
operation controller means for controlling operation of the VOX controller means;
storage means for storing a plurality of thresholds for each of a plurality of usage conditions; and
usage condition detector means for determining in which one of the plurality of usage conditions the terminal is shifted in; wherein
the operation controller means is constructed to select one of the thresholds in correspondence with a detection result by the usage condition detector means and to operate the VOX controller means in accordance with the selected threshold;
the VOX controller means is constructed to compare at least one physical quantity of a plurality of physical quantities each having a different unit system as the physical quantity in relation to the voice input with a threshold;
the operation controller means is constructed to select at least one threshold having one unit to operate the VOX controller means in accordance with the selected at least one threshold, when the usage condition detector means determines one of the usage conditions; and
the operation controller means selects at least one of thresholds having another unit different from the one unit to operate the VOX controller means in accordance with at least the selected other threshold, when the usage condition detector means determines another usage condition different from the one of usage conditions.

17. A mobile terminal comprising:
VOX controller means for reducing a power feed to a part of a transmitter;
operation controller means for controlling operation of the VOX controller means;
storage means for storing a plurality of thresholds corresponding to a plurality of usage conditions; and
usage condition detector means for determining in which one of the plurality of usage conditions the terminal is shifted in; wherein
the operation controller means is constructed to select one of the thresholds in correspondence with a detection result by the usage condition detector means and to operate the VOX controller means in accordance with the selected threshold;
the VOX controller means is constructed to compare at least one physical quantity of a plurality of physical quantities each having a different unit system as the physical quantity in relation to the voice transmission with a threshold;
the operation controller means is constructed to select at least one threshold having one unit to operate the VOX controller means in accordance with the selected at least one threshold, when the usage condition detector means determines one of the usage conditions; and
the operation controller means selects at least one of thresholds having another unit different from the one unit to operate the VOX controller means in accordance with at least the selected other threshold, when the usage condition detector means determines another usage condition different from the one of usage conditions; wherein
the VOX controller means is constructed to compare with a threshold at least one of a power of voice transmission and a frequency component of voice transmission used as the physical quantity in relation to the voice transmission;
the operation controller means is constructed to select a threshold in relation to the power of voice transmission and a threshold in relation to the frequency component of voice transmission and use the threshold selected for the power of voice transmission and the threshold selected for the frequency component of voice transmission to operate the VOX controller means, when the usage condition detector means determines either one of the handset usage condition or the headset microphone usage condition; and
the operation controller means is constructed to select a threshold in relation to the power of voice transmission and uses the threshold selected for the power of voice transmission to operate the VOX controller means, when the usage condition detector means determines the hands-free microphone usage condition.

18. A mobile terminal comprising:
VOX controller means for reducing a power feed to a part of a transmitter;
operation controller means for controlling operation of the VOX controller means;
storage means for storing a plurality of thresholds corresponding to a plurality of usage conditions; and usage condition detector means for determining in which one of the plurality of usage conditions the terminal is shifted in; wherein the operation controller means is constructed to select one of the thresholds in correspondence with a detection result by the usage condition detector means and to operate the VOX controller means in accordance with the selected threshold;

the storage means further stores a plurality of bandwidth conditions corresponding to the plurality of usage conditions;

the operation controller means is constructed to select one bandwidth condition having one predetermined frequency bandwidth and use the one bandwidth condition thus selected to operate the VOX controller means, when the usage condition detector means determines one usage condition; and the operation controller means is constructed to select one of other bandwidth conditions each having a predetermined frequency bandwidth different from the one predetermined frequency bandwidth and use the bandwidth condition thus selected to operate the VOX controller means, when the usage condition detector means determines one of other usage conditions different from the one usage condition.

19. The mobile terminal according to claim 18, wherein:

the operation controller means is constructed to select one bandwidth condition having one predetermined frequency bandwidth and use the one bandwidth condition thus selected to operate the VOX controller means, when the usage condition detector means determines the handset usage condition or the headset microphone usage condition; and the operation controller means is constructed to select one of other bandwidth conditions each having a predetermined frequency bandwidth different from the one predetermined frequency bandwidth and use the one of the other bandwidth conditions thus selected to operate the VOX controller means, when the usage condition detector means determines the hands-free microphone usage condition.

20. The method as in claim 11 further comprising:

storing a plurality of thresholds for each microphone and wherein the step of setting a threshold includes selecting one of the plurality of thresholds of the detected microphone.

* * * * *